Patented Jan. 13, 1948

2,434,536

UNITED STATES PATENT OFFICE 2,434,536

EMULSION POLYMERIZATION PROCESS

Erving Arundale, Colonia, N. J., assignor to Standard Oil Development Company, a corporation of Delaware No Drawing. Application July 14, 1942, Serial No. 450,919

10 Claims. (Cl. 260—84.5)

The present invention pertains to the production of synthetic rubber-like materials and in particular to the preparation of such materials by emulsion polymerization.

It is of course well known that synthetic rubber-like materials can be prepared by the polymerization of diolefins such as butadiene and its homologues or by the interpolymerization of such diolefins with copolymerizable materials such as styrene, alpha methyl styrene, vinyl naphthalene, acrylic acid nitrile, methacrylic acid nitrile, methyl methacrylate, ethyl fumarate, methyl vinyl ketone and the like. The preparation of such synthetic rubber-like materials is usually effected in aqueous emulsion using a compound capable of liberating oxygen such as hydrogen peroxide, benzoyl peroxide, sodium perborate and alkali metal persulfates as catalyst. Emulsifiers used in this process include water-soluble soaps such as alkali metal oleates and stearates as well as various synthetic surface active emulsifying agents such as salts of alkylated naphthalene sulfonic acids, fatty alcohol sulfates and also certain acid addition salts of high molecular alkyl amines.

The polymers that have been obtained in this manner have as a general rule been found to be objectionable because of their lack of plasticity, particularly when the polymerization is conducted for a period sufficient to give high conversions of the monomeric materials used. This lack of plasticity gives rise to difficulties in the mastication of the rubber since it will not band readily on an open rubber mill and is equally difficult to handle in a mixer of the Banbury type. In order to overcome this objection, it has been proposed that auxiliary or modifying agents be added to the polymerization mixture in order to regulate the polymerization. U. S. Patent No. 2,281,613 for example, describes the addition of mercaptans having at least 6 carbon atoms in an aliphatic linkage to the polymerization mixtures to the end that the polymerization of butadiene hydrocarbons may be carried out in aqueous emulsion without retarding the course of the polymerization and without the formation of polymers which are highly insoluble in benzene.

It is an object of the present invention to provide the art with a novel method of preparing emulsion polymerizates of diolefins and particularly copolymers of butadiene hydrocarbons with one or more monoolefinic compounds. It is a further object of this invention to provide the art with a method whereby emulsion polymerizates of butadiene hydrocarbons and emulsion copolymerizates of butadiene hydrocarbons and other copolymerizable compounds containing a single vinyl group of more uniform quality and vastly improved properties may be obtained.

These and other objects will appear more clearly from the detailed description and claims which follow.

It has been found that synthetic rubber-like materials of improved properties and uniformity are obtainable if an effective amount of a modifier such as a high molecular aliphatic mercaptan is added portionwise during the reaction rather than in its entirety at the outset of the polymerization reaction. When using this technique an improved reaction rate is also obtained.

This invention is applicable to the emulsion polymerization of butadiene hydrocarbons singly or in mixtures as well as with compounds containing a single C=C linkage and capable of forming copolymerizates with butadienes. Some butadienes which may be polymerized in accordance with the present invention include butadiene-1,3 and the homologues thereof, particularly isoprene, piperylene, and dimethyl butadiene or hexadiene-2,4. The copolymerizable materials containing a C=C linkage include for example such compounds as styrene, alpha methyl styrene, acrylic acid nitrile, methacrylic acid nitrile, acrylic and methacrylic acid esters, fumaric acid esters, unsaturated ketones (such as methylvinyl ketone) and 1-1 dichloroethylene.

The catalysts which may be used in the polymerization are substances which are capable of liberating oxygen under the conditions employed in the polymerization and include hydrogen peroxide, benzoyl peroxide, alkali metal or ammonium perborates or persulfates. The catalysts are used in about the usual amounts, i. e., about 0.1% to about 0.3% based upon the water present. The water is as a general rule used in the ratio of about 2 parts by weight per part by weight of monomeric polymerizable materials.

The emulsifiers used are those usually employed such as sodium or ammonium salts of high molecular weight fatty acids, alkali metal salts of alkylated naphthalene sulfonic acids or fatty alcohol sulfates and the amount thereof is generally from about 1% to about 5% based upon the water in the polymerization mixture.

The modifiers used in accordance with this invention are high molecular aliphatic mercaptans, that is, containing at least 7 and preferably 10 or more carbon atoms in an aliphatic linkage. The preferred modifier is a mixture of aliphatic mercaptans having an average molecular weight of 188-250 and containing at least 50% of dodecyl mercaptan, the remaining 50% being mercaptans containing from 10 to 16 carbon atoms in the molecule. Such a mixture of mercaptans can be prepared by blending pure individual mercaptans or by converting a suitable mixture of $C_{10}$ to $C_{16}$ alcohols for example "Lorol" alcohol (Du Pont) containing approximately 55% of $C_{12}$, 30% of $C_{14}$ and 15% of $C_{16}$ alcohols directly to the corresponding mercaptans. In place of the mono mercaptans, di mercaptans such as those prepared from higher glycols (decamethylene glycol) can be used. The modifiers are used in amounts of between about 0.125% and 0.5% based on the water present in the emulsion.

It has been found that the greatest advantages are realized if not more than 50% of the total mercaptan is added to the polymerization mixture at the start of the polymerization and the remainder is added portionwise after polymerization has proceeded for several hours. For example, if 50% of the mercaptan is added initially, 25% is added after about 3 or 4 hours and the remaining 25% is added when a conversion of about 45 to 60% is reached. The modifier could also be added at higher conversions if desired and this largely depends upon the yields to which the reaction is carried. It is also within the scope of this invention to add the modifier continuously during the entire course of the polymerization reaction.

It has also been found advantageous to utilize different mercaptans, adding the mercaptan of highest molecular weight initially and then adding portions of lower mercaptans of decreasing molecular weight at intervals during the polymerization. For example, about 50% of myristyl mercaptan is added initially followed by 25% of dodecyl or "Lorol" mercaptan after 3 hours and 25% as decyl or octyl mercaptan after 50% conversion has been obtained.

The additional mercaptan is best added to the polymerization mixture in solution in one of the monomers which takes part in the polymerization, for example, in acrylonitrile if "Perbunan" type polymers are being prepared or in styrene if "Buna-S" type polymers are being prepared or in the diolefin itself. This added monomer may be part of the original charge or it may represent an additional amount. The mercaptan may also be added as an emulsion in the soap solution.

The following examples will serve to illustrate my invention, but it is to be understood that the invention is by no means limited thereto.

Example I

Two similar butadiene-styrene runs were carried out in a small autoclave, in the first of which runs, labeled A in the following table, all of the mercaptan was added initially while in the second run, labeled B, one-half of the modifier was added initially, one-fourth after 3 hours and one-fourth after 50% conversion. The general conditions applied in both runs were as follows:

Emusifier------ 2.5% sodium oleate (basis water)
Catalyst-------- 0.15% $K_2S_2O_8$ (basis water)
Modifier-------- 0.25% "Lorol" mercaptan (basis water)
Temperature--- 45° C. for 6 hrs.—50° C. for remainder
Ratio of butadiene/styrene-- 74/26
Ratio of water/reactants----- 2/1

The results are summarized in the following table:

| Run | Reaction Time | Conversion | Tensile Strength | Ultimate Elongation | Plasticity | |
|---|---|---|---|---|---|---|
| | | | | | Williams | Mooney[1] |
| | Hours | Per cent | Pounds | | | |
| A | 13 | 60 | 3,100 | 550 | 99-1 | 46 |
| | 14 | 64 | 3,360 | 550 | 112-2 | 52 |
| | 15 | 72 | 3,570 | 540 | 112-1 | 52 |
| | 16½ | 75 | 3,390 | 540 | 143-11 | 81 |
| | 9½ | 44 | 3,520 | 540 | 98-6 | 46 |
| B | 11½ | 58 | 3,250 | 480 | 117-1 | 56 |
| | 13 | 67 | 3,270 | 500 | 107-4 | 49 |
| | 14½ | 73 | 3,290 | 510 | 125-5 | 62 |
| | 16 | 82 | 3,300 | 460 | 131-9 | 67 |

[1] Estimated from data for Williams.

The milling properties of the products were definitely improved in the second run.

Example II

Three butadiene-acrylonitrile runs were carried out in a small autoclave under the following general conditions:

Emulsifier-------- 2% sodium oleate+0.5% oleic acid (basis water)
Catalyst---------- 0.15% $(NH_4)_2S_2O_8$ (basis water)
Modifier---------- 0.25% "Lorol" mercaptan (basis water)
Temperature----- 30° C. for 3 hrs.—35° C. for remainder
Ratio of butadiene/acrylonitrile 74/26
Ratio of water/reactants--------- 2/1

The results of these runs are summarized in the the following table:

| Run | Time | Conversion | Tensile | Ultimate Elongation | Williams Plasticity |
|---|---|---|---|---|---|
| | Hours | Per cent | | | |
| A[1] | 7½ | 52 | 3,880 | 770 | 102-0 |
| | 8½ | 57 | 3,900 | 770 | 103-0 |
| | 10 | 64 | 3,980 | 820 | 118-1 |
| | 12 | 71 | 4,320 | 720 | 138-7 |
| | 13 | 76 | 4,490 | 710 | 152-32 |
| B[2] | 9 | 61½ | 3,320 | 720 | 76-0 |
| | 11 | 67 | 3,330 | 690 | 85-0 |
| | 13 | 76½ | 3,360 | 600 | 123-1 |
| | 14 | 60 | 2,680 | 780 | 62-0 |
| C[3] | 15 | 66½ | 2,890 | 750 | 63-0 |
| | 16 | 73 | 2,900 | 750 | 60-0 |
| | 17 | 76½ | 2,720 | 660 | 65-0 |

[1] All mercaptan added in initial charge.
[2] One half of mercaptan added initially and one quarter after 3 hrs. and one quarter at 45% conversion.
[3] 0.1% of Lorol mercaptan was added initially and the remaining 0.15% was added dropwise during the run up to about 60% conversion.

The 17 hour product in Run C banded immediately on an open rubber mill and did not fall off the mill rolls at 250° F.

What I claim and desire to secure by Letters Patent is:

1. In the manufacture of synthetic rubber-like materials by the polymerization of a conjugated diolefin hydrocarbon in aqueous emulsion in the presence of an aliphatic mercaptan polymerization modifier containing between 8 and 16 inclusive carbon atoms the improvement which comprises adding 50% of the mercaptan modifier to the emulsion initially, adding 25% of the modifier after polymerization has proceeded for from 3 to 5 hours, and adding the remaining 25% after about 50% conversion of the monomers, the total amount of mercaptan modifier being between 0.25% and 0.5% by weight, based on the water present in the emulsion.

2. In the manufacture of synthetic rubber-like materials by the interpolymerization of a conjugated diolefin hydrocarbon and acrylonitrile in aqueous emulsion the improvement which comprises adding an aliphatic mercaptan polymerization modifier containing 8 to 16 carbon atoms per molecule to the emulsion continuously during the entire course of the polymerization a substantial portion not exceeding 50% of said modifier being added initially the total quantity of said modifier being not less than 0.125% and not more than 0.5% based on the weight of the water present in the emulsion.

3. In the manufacture of synthetic rubber-like materials by the polymerization of a conjugated diolefin hydrocarbon in aqueous emulsion, wherein a plurality of aliphatic mercaptans containing from at least 8 to a maximum of 16 carbon atoms to the molecule are used as polymerization modifiers, the improvement which consists in adding said modifiers to the emulsion in a series of steps, the mercaptan of highest molecular weight comprising a substantial proportion of the total modifier being added first, followed by the addition of a plurality of portions of decreasing molecular weight during a substantial part of the polymerization reaction time the total amount of said modifiers being between 0.125% and 0.5% based on the water present in the emulsion.

4. In the manufacture of synthetic rubber-like materials by the interpolymerization of butadiene-1,3 and styrene in aqueous emulsion the improvement which comprises adding a polymerization modifier consisting of an aliphatic mercaptan mixture to the emulsion, a substantial part of said modifier, not exceeding about 50% being added initially and the remainder being added in a plurality of steps over a period during which a substantial part of the polymerization occurs, said mercaptan mixture being composed of $C_{10}$ to $C_{16}$ mercaptans of which at least 50% is dodecyl mercaptan, the total amount of said modifiers being between 0.125% and 0.5% based on the water present in the emulsion.

5. In the manufacture of synthetic rubber-like materials by the interpolymerization of butadiene-1,3 and acrylonitrile in aqueous emulsion the improvement which comprises adding a polymerization modifier consisting of aliphatic mercaptans, a substantial part of said modifier, not exceeding about 50%, being added initially and the remainder being added in a plurality of steps over a period during which a substantial part of the polymerization occurs, said mercaptans consisting of $C_{10}$ to $C_{16}$ mercaptans of which at least 50% is dodecyl mercaptan, the total amount of said modifiers being between 0.125% and 0.5% based on the water present in the emulsion.

6. In the manufacture of synthetic rubber-like materials by the polymerization of a conjugated diolefin hydrocarbon in aqueous emulsion in the presence of an aliphatic mercaptan polymerization modifier containing 8 to 16 carbon atoms per molecule and in amount between 0.125% and 0.5% based on the water present in the emulsion, the improvement which comprises adding a portion up to 50% of the mercaptan modifier initially and adding the remainder of the modifier in a plurality of steps.

7. In the manufacture of synthetic rubber-like materials by the interpolymerization of a conjugated diolefin and acrylonitrile in aqueous emulsion in the presence of an aliphatic mercaptan polymerization modifier containing 8 to 16 carbon atoms per molecule and in amount of 0.125% to 0.5% based on the water present in the emulsion, the improvement which comprises adding a portion up to 50% of the mercaptan modifier initially and adding the remainder of the modifier in a plurality of steps.

8. In the manufacture of synthetic rubber-like materials by the interpolymerization of butadiene 1,3 and styrene in aqueous emulsion in the presence of an aliphatic mercaptan polymerization modifier containing 8 to 16 carbon atoms per molecule and in amount between 0.125% and 0.5% based on the water present in the emulsion, the improvement which comprises adding a portion up to 50% of the mercaptan modifier initially and adding the remainder of the modifier in a plurality of steps.

9. In the manufacture of synthetic rubber-like materials by the interpolymerization of butadiene 1,3 and acrylonitrile in aqueous emulsion in the presence of an aliphatic mercaptan polymerization modifier containing 10 to 16 carbon atoms per molecule of which at least 50% is dodecyl mercaptan and in amount between 0.125% and 0.5% based on the water present in the emulsion, the improvement which comprises adding 50% of the mercaptan modifier to the emulsion initially, adding 25% of the mercaptan modifier after polymerization has proceeded from 3 to 5 hours and adding the remaining 25% after about 50% conversion of the diolefin hydrocarbon.

10. In the manufacture of synthetic rubber-like materials by the polymerization of a conjugated diolefin hydrocarbon in aqueous emulsion in the presence of an aliphatic mercaptan polymerization modifier containing 10 to 16 carbon atoms per molecule of which at least 50% is dodecyl mercaptan and in amount between 0.125% and 0.5% based on the water present in the emulsion, the improvement which comprises adding a portion up to 50% of the mercaptan modifier to the emulsion initially and adding the remainder of the modifier in a plurality of steps.

ERVING ARUNDALE.

REFERENCES CITED

The following references are of record in the file of this patent:

UNITED STATES PATENTS

| Number | Name | Date |
| --- | --- | --- |
| 2,281,613 | Wollthan et al. | May 5, 1942 |

FOREIGN PATENTS

| Number | Country | Date |
| --- | --- | --- |
| 514,912 | Great Britain | Nov. 21, 1939 |
| 497,706 | Great Britain | Dec. 19, 1938 |
| 843,903 | France | Apr. 3, 1939 |